UNITED STATES PATENT OFFICE 2,198,601

ROOF AND SIDING MATERIAL

Lorrin T. Brownmiller, Easton, Pa., assignor to Bakelite Building Products Co. Inc., New York, N. Y., a corporation of Delaware No Drawing. Application July 11, 1935, Serial No. 30,942. Renewed July 6, 1939

9 Claims. (Cl. 91—68)

This invention relates to a porous cementitious composition for roofing and siding material and to a process for making the same. The invention, moreover, particularly relates to roofing and siding elements comprising said composition or having said composition as a facing or surfacing.

Portland cements or other hydraulic cements containing free lime have generally been unsatisfactory for the weather exposed surfaces of shingles in roof or siding coverings and for other building materials, particularly where the surfaces are colored other than white, because of their tendency to liberate salts forming a surface blemish of irregular areas or spots of white crystals, commonly referred to as blooming or efflorescence. It is believed that the blemish may be due to the liberation of calcium salts or calcium hydroxide which migrate to the surface of the cement where they react with the carbon dioxide of the atmosphere to form a deposit of crystals of calcium carbonate. While it has been proposed to remove the affected areas by scrubbing and washing, and to some extent by other known surface treatments, the action continues to reoccur during ageing of the cement as long as any free lime remains, unless resisted in the manner described in my copending application Ser. No. 675,460, filed June 12, 1933. Factory treatments, while helpful, are obviously not a satisfactory solution and are, moreover, expensive. Furthermore, it is also apparent that the layman does not desire to scrub or treat the roof or sides of his building to remove the blemish when it is realized that such will reoccur.

It has also been proposed to make porous cement products by employing Portland cements containing free lime or to which an excess has been added, and including therewith metallic aluminum as a gas forming agent to bring about volume expansion. In order to obtain a proper reaction of the metal to effect the liberation of gas, the presence of free lime has been considered vitally essential and therefore only cements of that character have heretofore been used. Such proposals not only result in products that bloom upon exposure but obviously require a consideration of the free lime content. Moreover, the compositions require a considerable period of curing before sufficient strength is available for use of the product.

Furthermore, shingles having a slab of slate cemented to a base sheet by asphalt or the like to form the weather exposed portion thereof have been proposed, but have been unsatisfactory because of the unfavorable bond between the dense slate surface and the adhesive. Moreover, as shingles are generally laid upon steeply inclined surfaces the considerable mass of the slate slabs also results in slipping between these two layers in weather exposure, under the influence of heat. Slabs of a sand-cement composition are also substantially dense and heavy and have similar disadvantages, unless applied as a plastic and provided with some form of intermediate bond such as mineral granules anchored in the bitumen.

In accordance with the present invention it is believed that the aforesaid considerations are substantially avoided, if not entirely prevented.

It is among the objects of the invention:

To provide a substantially firm, light weight porous product for exposure to the weather, which is resistant to heat and the erosive and softening action of water and substantially free of surface blooming or efflorescence.

To provide an improved process for making a material of the type indicated.

To utilize the aforesaid characteristics of the composition of the invention in the provision of a roofing and siding shingle.

To treat a plastic mass comprising a high aluminate or natural cement with a levitating agent to form a light weight product containing a considerable percentage of voids.

To provide a porous cementitious product containing facial voids for the mechanical anchorage of a further plastic material.

To provide products of the aforesaid character possessing a considerable percentage of voids to provide insulation and/or sound absorbing properties.

To provide a semi-rigid shingle element including a flexible base and a non-slipping facing comprising a porous cement composition, which facing may be bulked at the butt portions to provide a heavy edge for weather exposure.

To provide a composition adaptable to the natural formation of rough textures or to the obtaining of particular effects such as that of stone or brick by embossing a face of the composition.

Various other objects will be apparent from the following description and claims.

In order to overcome the highly objectionable feature of blooming or efflorescence to a marked degree, I prefer to use a high alumina cement preferably carrying between 60-95% of calcium aluminates or calcium alumina ferrites, which when properly made as by fusion, are believed to be entirely free of free lime. High aluminate cements including quantities of free lime which have been substantially converted into such products as calcium carbonate in their making, and natural cements are also substantially satisfactory in overcoming the objection. Such cements are substantially free or greatly resistant to blooming or efflorescence and retain their surface characteristics for long periods of time. Also the high aluminate cements obtain a high early strength and this property is also of considerable importance in a porous structure for the walls of the voids quickly gain full strength and permit use of the product shortly after forming. It is thus a feature of the invention to provide a cementitious composition containing ingredients possessing one or more of the aforementioned characteristics.

A further feature of the invention comprises the treatment of a cement of the above type by aeration to produce a light weight porous or cellular mass containing actual voids, and having characteristics suitable for covering materials for interior and exterior application, for instance, walls, roofs and sides of buildings, tiles and composite structures including waterproof or fibre layers. To accomplish this, in general I incorporate with the cementitious mass which may include extending materials, sufficient liquid to accomplish its hydration and a material which reacts in the presence of these ingredients to give off or generate a gas. Such material is preferably mixed with the dry constituents or included when the wet mix is made. Bubbles of the gas are dispersed throughout the mass during the setting reaction, causing the mass to expand considerably in volume. The action continues until the material is either exhausted or the mass has set. Obviously, the amount of expansion will be somewhat dependent upon the extent of gas generated and upon the nature of the cement composition and its ability to hold the bubbles thereof. It has been found that under certain conditions metallic aluminum which is preferred because of its non-injurious effect upon the composition in the obtaining of the features of the invention not excluding its cheapness, and other metals, for instance, zinc, are satisfactory for the above purpose and will react to release or liberate a gas when used with a high aluminate or a natural cement which contains no free lime or which contains it in amounts insufficient to obtain proper results according to previous proposals. Such conditions contemplate the maintenance of a minimum temperature during the reaction period to cause generation of the gas to take place, external heat being provided as a catalyst when necessary for this purpose. By this method a product having a proper set that may have a high early strength and that is light, porous and substantially free of blooming or efflorescence may be obtained.

I desire it to be understood that while I prefer to make my porous composition by generating or releasing the gas into the cement mixture by the described means by reason of its cheapness and dispersion through the mass before reaction sets in, I may also make a product having the characteristics of the invention by either beating gases or blowing compressed gases into the cement composition.

As a further feature of the invention it has been found that the addition of certain fibres cause the composition to greatly increase in bulk, perhaps due to the fibres retarding the escape of gas bubbles and causing the mass to froth, with a high percentage of voids, which are retained when the cement sets. Comparatively long fibres appear to produce the most desirable results, possibly because they interlock and give the plastic mixture a tensile strength not possessed by cement compositions containing only small amounts of short fibrous material, and interlock with sufficient strength to entrap the gas bubbles and hold them in suspension during setting of the cement. Long fibres also increase the mechanical strength of the hardened composition and greatly aid in preventing the material from curling or otherwise deforming during the setting process.

Other features of the invention consist in the various details of operation, the combination of steps and the various constructions hereinafter more fully set forth.

Although the novel features which are believed to be characteristic of this invention will be more particularly pointed out in the appended claims, the nature and scope of the invention may be further and better understood by referring to the specific embodiments thereof which are set forth for purposes of illustration in the following description.

In accordance with the preferred manner of carrying out my invention a high aluminate cement or a natural cement of the aforesaid characteristics may be mixed with a quantity of metallic aluminum, preferably in the form of finely divided particles or as flakes, and with a mineral, animal or vegetable fibrous material, preferably flocculent, which may be, for instance, asbestos fibres, hair, wood fibres, cellulose fibres, shredded vegetable fibres, mineral wool, cotton linters. A suitable temperature, preferably in excess of about 75° F. may be maintained to cause the aluminum to react with the calcium aluminates of the cement in the presence of water to bring about the release or liberation of hydrogen gas and to form a less basic calcium aluminate. Dependent upon the conditions of application it is preferred that the mix, until used, be maintained at a temperature of about 60° F. or less, in order that substantial gasification of the mass may not occur prematurely. The fibres are preferably of appreciable length so as to interlock to retard the escape of the hydrogen and to impart sufficient rigidity to prevent curling or warping when the cement sets. Other light weight aggregates, for instance, granulated cork, may also be included and short fibrous material as aggregates are also not excluded.

As a specific example, a quantity of asbestos fibres, at least ⅛ of an inch in length, are mixed with fine aluminum flakes and the mixture is thoroughly stirred or beaten in water (sufficiently cold to make the temperature of the mix substantially 60° F. or less) so as to disperse the aluminum in the asbestos, a suitable quantity of water being used to produce a plastic mass. To this mass a desired quantity of high aluminate or natural cement is added. The cement is thoroughly stirred into the mass with the addition of whatever quantity of water may be necessary to maintain the mass in plastic condition. In one instance ⅟₆₀ of a pound of aluminum and 1 pound of asbestos fibres were used with four pounds of cement, and sufficient water included to make a plastic mass. It will be understood, however, that these proportions may be varied over a substantial range.

The plastic composition it will be understood may be formed into any desired shape as in a mold, or may be applied as a facing or coating on a base material, for instance, a fibrous web, or a web impregnated and/or coated with asphalt or a base of any of the combinations or materials hereinafter referred to. In any case it is then preferably maintained at a temperature in excess of about 75° F. to cause the desired reaction to occur or continue until the cement sets or the aluminum is exhausted. The molds may be preheated or the base may be a hot one if desired. Also the impregnant or coating of the base may be in a plastic condition when the composition is applied. While it is preferred that the temperature of the mix before use be sufficiently cold to substantially prevent gasification occurring, which it will be understood is particularly important where the mix is to be used as a coating, it will be obvious that in certain cases as when the mix is made in a mold or is to be poured into one to make a slab of substantial thickness this precaution may, if desired, be omitted.

The gas causes the mass to froth and to increase greatly in bulk according to the amount of gas generated and the composition of the mix, so that the cement sets, in the form of a light porous mass containing a considerable percentage of voids that are substantially uniformly distributed and in which the interstitial walls are as substantially firm and strong as the surface walls.

The temperature of the material is preferably maintained until the cement has sufficiently set or hardened to possess strength to retain its porous structure. Such will be rapid in the case of a high aluminate cement. According to the manner in which the material is manipulated and whether dense surface walls are desired as where the material is to be exposed to the weather, or open surfaces as for acoustical purposes, the surface walls of the set material may be opened or coalesced as desired.

If the cement has been cast into the form of a large blank it may be cut or sawed into desired shapes such as individual shingles. If the cement composition has been applied as a coating over a base material the same may be cut into the desired lengths or shapes for use.

It is also contemplated that a lining of impregnated and/or coated fibrous material, for instance, felt, may be applied after the cement body has set. For this purpose the felt is impregnated and/or coated with a suitable adhesive which may comprise, for instance, a silicate, a natural or synthetic resin and/or a hot or emulsified bitumen, as asphalt and is pressed with the set cement composition. The adhesive bonds with the cement composition and enters the pores or voids of the set mass to form a firm mechanical anchorage securing the layers together.

This construction is particularly useful in the making of roofing and siding shingles since the composition of the invention can be securely anchored to the base adhesive without the need of an intermediate bond, and can also be bulked to a considerable degree because of its light weight. Moreover, because of the character of anchorage provided and the light weight of the composition it will not slip under the influence of heat when laid to the weather. Such characteristics are not in the prior art as hereinbefore mentioned.

It has also been found that the cement composition of the invention will adhere to a wooden base, such as a wooden shingle. The surface of the shingle is preferably roughened and the plastic composition is applied thereto and treated in the above manner until the cement sets and forms a light porous coating over the wooden base.

As previously stated the surface of the composition may be coalesced where desired. This may be accomplished for instance by the polished face of a mold by a slight troweling action thereover or by the addition of a liquid veneer comprising cement which may also be a color coating.

It is also contemplated that the cement mass employed for the invention may include coloring material such as dyes or mineral coloring matter providing such materials are not included in quantities or in a manner that may cause slumping of the mixture. Moreover, where desired, the surface may be embossed at any time before the composition has taken a permanent set by the application of an embossing tool thereto or by casting the material in a mold having a proper surface.

In certain instances it may be desirable to coat the cement composition with any of the aforesaid adhesive materials without the use of a felt web. In such cases the adhesive may be applied directly to the hardened composition and a sheet of paper or the like may be applied over the adhesive as to prevent the elements from sticking together during subsequent use, as for example, when they are piled for storage or shipment. The paper may be removed when the shingles are used or may be permitted to remain for the additional reinforcement it provides.

It is obvious that the cement composition of the invention may be used over a base having a granular particle surface such as of brick, slate, shale, etc. if desired, to form semi-rigid shingles. It is also obvious that the composition may be applied in any of the foregoing constructions where singles are to be made, to only the exposed portions thereof. In that case the shingles would be somewhat lighter and the laying thereof in certain assemblies would be facilitated inasmuch as the top edge of the cement composition on one course of shingles could serve as a guide for the butts of the shingles of the next course.

From the foregoing it will be seen that a novel invention has been presented that is particularly useful in the making of roofing and siding materials, and that is possessive of characteristics not heretofore known to the art. Although the invention has been applied to a specific composition and to certain structures by way of example, it is not to be limited thereto as various changes and modifications will become evident to persons skilled in the art without departing from the features hereinbefore set forth. It is therefore desired that the invention be construed as to include all equivalents and as broadly as the claims taken in conjunction with the prior art, may allow.

I claim:

1. The process of making building material having a base and a light weight cellular cementitious facing, which comprises providing a base and a hydraulic cement substantially free of free lime but containing calcium aluminates, incorporating with said cement, water and metal particles adapted to actively generate a gas in reaction with said calcium aluminates and water, at temperatures in excess of about 75° F. but not at temperatures of about 60° F. or less, reacting said cement and metal particles of the wet cementitious mass at a temperature of the mass in excess of about 75° F., whereby bubbles of gas are generated and dispersed through the wet mass to produce an expanded volume of cellular character, hardening the cementitious mass while retaining the cellular structure, and bonding said cementitious mass to said base.

2. The process of making building material having a light weight cellular cementitious layer comprising providing a base and a hydraulic cement substantially free of free lime but containing calcium aluminates, incorporating with said cement, water and metal particles adapted to actively generate a gas in reaction with said calcium aluminates and water at temperatures in excess of about 75° F. but not at temperatures of about 60° F. or less, and preparing said cementitious mass as to have a temperature of about 60° F. or less, forming a layer of said wet cementitious mass on the base, raising the temperature of said cementitious layer in situ during setting reaction of the cement, to about 75° F. or greater to cause active reaction of said cement and metal particles, whereby bubbles of gas are generated and dispersed through the wet mass to produce an expanded layer of cellular character, and permitting said layer to harden.

3. The process of making building material having a base and a light weight cellular cementitious layer, comprising providing a base and a hydraulic cement substantially free of free lime but containing calcium aluminates, incorporating with said cement, long fiber, water, and metal particles adapted to activately generate a gas in reaction with said calcium aluminates and water at temperatures in excess of about 75° F. but not at temperatures of about 60° F. or less, forming a layer of the wet cementitious material on said base, reacting said cement and metal particles of the wet mass at a temperature of the mass in excess of about 75° F. and during the setting reaction of the cement, whereby bubbles of gas are actively generated and dispersed through the wet mass to produce an expanded layer of cellular character and permitting said cementitious layer to harden.

4. The process of making building material having a base and a light weight cellular cementitious layer which comprises providing an adhesive surfaced base and a hydraulic cement substantially free of free lime and carrying essentially calcium aluminates or calcium alumina ferrites, incorporating with said cement, fiber, water and aluminum particles, forming a layer of the wet cementitious material on the base before the base adhesive has set, and reacting the cement and aluminum particles of the wet mass during the setting reaction of the cement and at a temperature of the mass in excess of about 75° F., whereby to actively generate and disperse bubbles of hydrogen gas through the wet mass to produce an expanded layer of cellular character, and permitting said expanded layer to harden.

5. The process of making building material having a light weight cellular cementitious layer comprising providing a base in heated condition, and a hydraulic cement substantially free of free lime but containing calcium aluminates, incorporating with said cement, fiber, water, and metal particles adapted to actively generate a gas in reaction with said calcium aluminates and water and at temperatures in excess of about 75° F. but not at temperatures of about 60° F. or less, said water being sufficiently cold to produce a temperature of the mix of about 60° F. or less, applying the mixture to the hot base to form a layer, heating said layer by heat transfer from the base, to a temperature in excess of about 75° F. to actively react said cement and metal particles of the wet layer, whereby bubbles of gas are generated and dispersed through the wet layer to produce an expanded layer of cellular character, and permitting said expanded layer to harden.

6. The process of making roofing and siding having a light weight cellular cementitious facing of natural rough texture comprising providing a base and a hydraulic cement substantially free of free lime but containing calcium aluminates, incorporating with said cement, fiber, water, and metal particles adapted to actively generate a gas in reaction with said calcium aluminates and water at temperatures in excess of about 75° F. but not at temperatures of about 60° F. or less, said water being sufficiently cold to retard active reaction of said metal, treating the base with bitumen in plastic condition, forming a layer of the wet cementitious mass on the base and heat treating said material to elevate the temperature thereof to about 75° F. or greater, to produce active reaction of the cement and metal, whereby bubbles of gas are generated and dispersed through the wet mass to produce an expanded volume of cellular character and hardening the cementitious layer while retaining the cellular structure and its natural rough surface texture.

7. A building element comprising a base, and a hardened expended cellular cement layer bonded thereto and containing a multiplicity of distributed voids, said cement layer comprising the hardened product of fiber and a hydraulic cement comprising calcium aluminates but substantially free of free lime, and said voids resulting from bubbles of gas produced during the setting reaction of the cement, and substantially in the absence of free lime, by reaction of the cement and a metal included therewith, and said hardened layer being substantially free of objectionable efflorescence in exposure.

8. Roofing and siding comprising a water resistant base and a hardened expanded cellular cement layer bonded thereto and containing a multiplicity of distributed voids, said layer comprising a hardened product of uniformly distributed long fibrous material and a high calcium aluminate cement substantially free of free lime, and said voids resulting from bubbles of gas produced during the setting reaction of the cement and substantially in the absence of free lime, by reaction of the cement and a metal included therewith, and said hardened layer being substantially free of objectionable efflorescence in exposure.

9. The process of making composite roofing and siding elements, which comprises providing a base and a hydraulic cement substantially free of free lime but containing calcium aluminates, mixing with said cement, water, and metal particles adapted to actively generate a gas in reaction with said calcium aluminates and water at temperatures in excess of about 75 degrees Fahrenheit, but not at temperatures of about 60 degrees Fahrenheit or less, reacting said cement and metal particles of the wet cementitious mass at a temperature of the mass in excess of about 75 degrees Fahrenheit, whereby bubbles of gas are generated and dispersed through the wet mass to produce an expanded volume of cellular character, forming a slab of the expanded cellular material having open facial voids on at least one side, treating the base with an adhesive material and pressing the slab and base together with the voided face of the slab against the base adhesive, to form a composite element.

LORRIN T. BROWNMILLER.